United States Patent [19]

Weisgerber

[11] 3,990,534

[45] Nov. 9, 1976

[54] POWER STEERING SYSTEM

[75] Inventor: Thomas W. Weisgerber, Saginaw, Mich.

[73] Assignee: General Motors Corporation, Detroit, Mich.

[22] Filed: Oct. 20, 1975

[21] Appl. No.: 623,637

[52] U.S. Cl. .................................. 180/132; 91/370; 91/375 R; 180/160

[51] Int. Cl.[2] .......................................... B62D 5/08

[58] Field of Search .......... 180/163, 160, 154, 132; 91/370, 375, 434

[56] References Cited

UNITED STATES PATENTS

| | | | |
|---|---|---|---|
| 1,947,991 | 2/1934 | Jessup | 91/375 X |
| 2,260,979 | 10/1941 | Morin et al. | 91/375 |
| 2,369,324 | 2/1945 | Thompson | 91/375 |
| 2,440,794 | 5/1948 | Bowling | 180/163 |
| 3,576,230 | 4/1971 | Taplin et al. | 180/141 |

*Primary Examiner*—Robert R. Song
*Assistant Examiner*—John A. Pekar
*Attorney, Agent, or Firm*—D. F. Scherer

[57] ABSTRACT

A vehicle steering system wherein a manual steering gear output controls actuation of a linear hydraulic motor. A control valve, which distributes fluid to and from the boost cylinder, is disposed between the pitman shaft and pitman arm of the manual steering gear. Rotation of the pitman shaft, in response to operator input, causes rotation of the control valve which directs fluid pressure to the hydraulic motor to provide steering assist. The fluid pressure is also directed, through the control valve, to selectively operate on hydraulic reaction members so that a force proportional to steering effort is transmitted back to the operator. A mechanical "overcenter feel" is also provided and has incorporated therewith a mechanical override to provide full manual steering when there is not sufficient fluid pressure to provide hydraulic assist for steering.

2 Claims, 4 Drawing Figures

POWER STEERING SYSTEM

This invention relates to steering systems and more particularly to steering systems wherein manual steer effort is assisted by a hydraulically powered cylinder.

Commonly in use today are two types of power steering systems. One system utilizes what is known as an integral steering gear system wherein the power cylinder is formed within the steering gear housing as is the valving to actuate the power cylinder. With this type of system, the output or pitman arm of the steering gear is connected into the steering linkage.

The other type of power steering systems in use today are known as hydraulic assist or hydraulic boost type systems. In this system, a conventional manual steering gear is employed and is assisted by a hydraulic linearly actuated motor. The motor consists of a cylinder and piston arrangement. The valving for such system is contained within the hydraulic motor and is responsive to output movement of the pitman arm of the steering gear to control the flow of fluid to and from the hydraulic motor to provide hydraulic assist on the steering linkage. In the boost type systems, both the manual gear output and the hydraulic boost cylinder are connected into the steering linkage. Systems of this type are shown in U.S. Pat. Nos. 3,151,696 and 2,996,048.

The present invention is particularly concerned with the latter of these systems, that is, hydraulic boost type systems. As above mentioned, the systems in use enclose the control valving for the hydraulic boost within the motor itself. Thus, the linkage must be adjusted such that the movement of the manual steering gear on the steering linkage actuates the valve within the hydraulic motor. The present invention seeks to improve on this type of system by placing the valve immediately on the output of the manual steering gear, between the pitman shaft and the pitman arm, such that the movement of the manual gear is immediately translated to hydraulic fluid control for actuation of the hydraulic motor.

The boost systems in use today also generally incorporate hydraulic reaction surfaces within the hydraulic motor such that the operator is given some feel of the amount of steer effort that is being required to operate his vehicle in a turning maneuver. This requires that the valve within the cylinder be machined to close tolerances for the availability of steer effort feedback in these systems. The present invention utilizes hydraulic reaction chambers built within the pitman arm of the steering gear of a simple construction which incorporates a vane and chamber type arrangement wherein the chamber and vane cooperate to feedback a force which is proportional to steer effort within these types of systems.

It is therefore an object of this invention to provide an improved vehicle steering system wherein a manual steering gear and linear hydraulic motor are utilized to provide steering power, and wherein the valving arrangement for fluid control to the hydraulic motor is disposed directly on the manual steering gear output.

It is another object of this invention to provide an improved vehicle steering system wherein a control valve is disposed between the steering gear pitman shaft and pitman arm for controlling the fluid flow to a linear hydraulic motor, and wherein hydraulic reaction chambers and vanes are disposed between the valve and the pitman arm to provide steer feel effort for the operator.

Another object of this invention is to provide in an improved steering system a manual steering gear wherein the output pitman shaft of the steering gear directly actuates a control valve before actuation of the pitman arm of the steering system, and wherein there is incorporated between the valve and the pitman arm a pair of hydraulic reaction chambers which provide steer effort feel for the operator and also wherein mechanical center feel and override is provided such that manual steering alone can be accomplished when hydraulic fluid pressure is not sufficiently available to provide the steering necessary.

These and other objects and advantages of the present invention will be more apparent from the following description and drawings in which.

Figure 1:
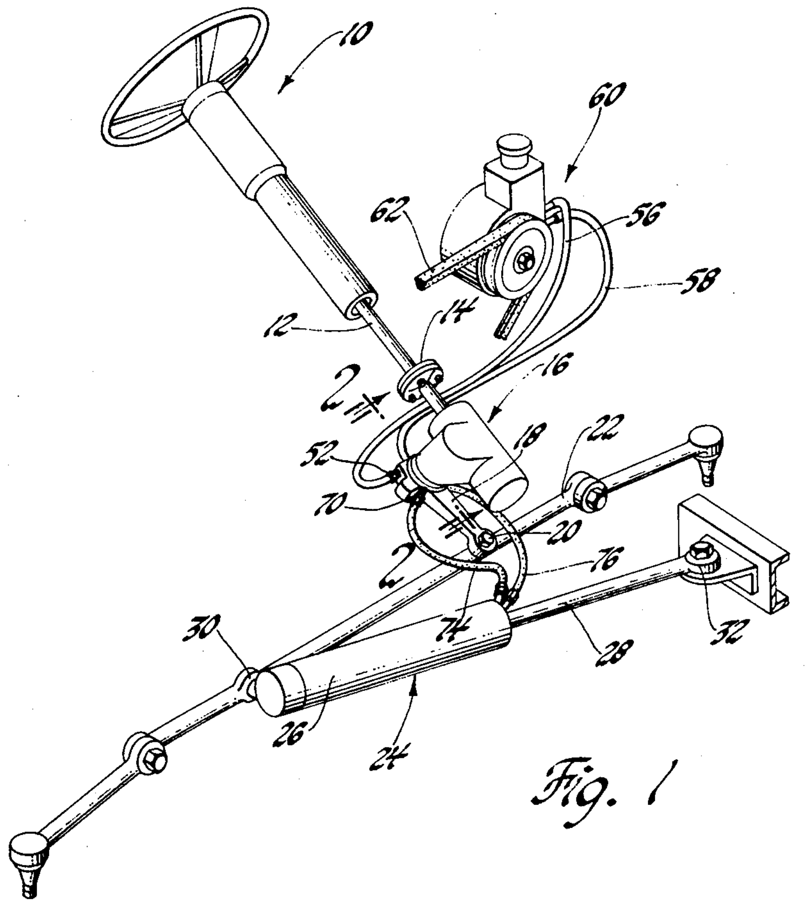
FIG. 1 is a diagrammatic view of the basic components of a steering system.

Referring to the drawings, wherein like characters represent the same or corresponding parts throughout the several views, there is seen in FIG. 1 a conventional steering wheel and mast jacket assembly 10 which includes a steer shaft 12 connected by a flexible coupling 14 to a manual steering gear 16. The manual steering gear 16 has an output pitman arm 18 which is connected pivotally at 20 to a vehicle steer linkage 22. The vehicle steer linkage is connected to the steerable wheels of a vehicle in a conventional manner. Also connected to the steer linkage is a linear hydraulic motor 24 which is comprised of a cylinder member 26 and a piston and rod member 28. This is a conventional hydraulic cylinder arrangement which is commercially available. The cylinder portion 26 of the motor 24 is connected at 30 to the steer linkage 22 and the rod end of piston and rod 28 is connected at 32 to a stationary member such as the vehicle frame. As is well known, the piston rod itself is of smaller diameter than the piston head which is slidably disposed within the cylinder 26 such that a differential area is formed between the piston and the cylinder on the rod side of the piston and a full area is formed between the piston and the cylinder on the head side of the piston.

Figure 2:
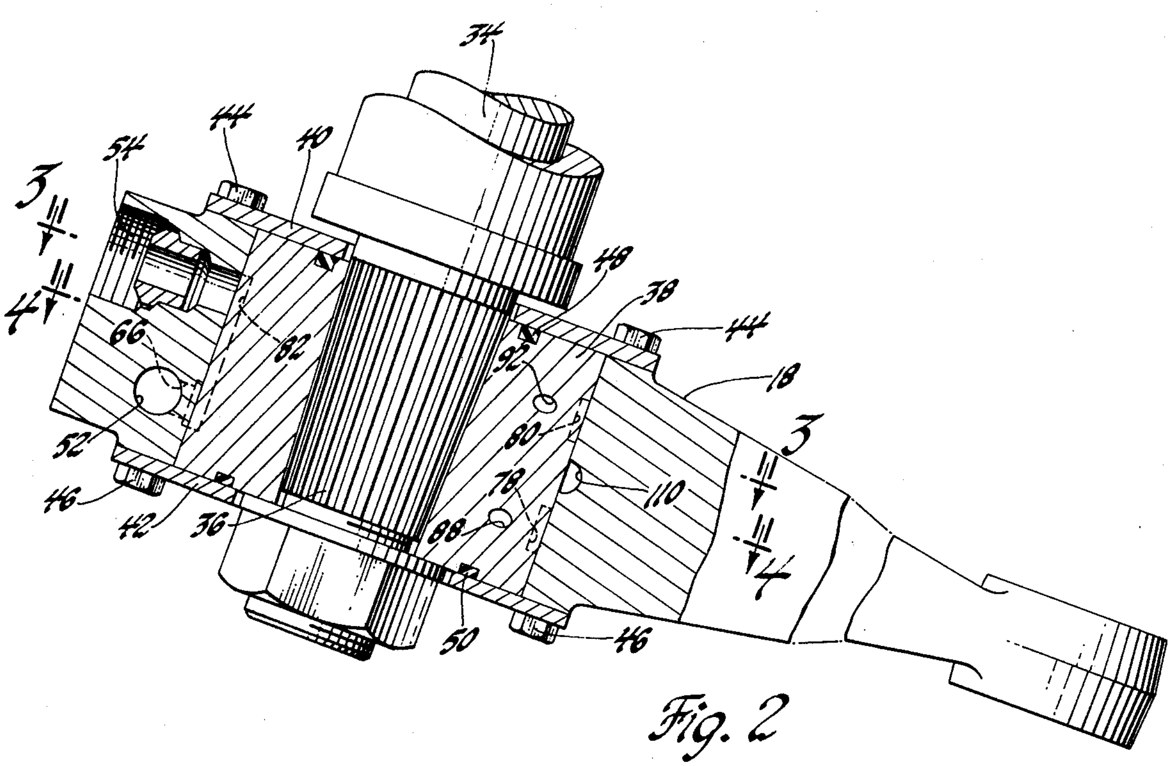
FIG. 2 is a sectional view taken along line 2—2 of FIG. 1.
Figure 3:
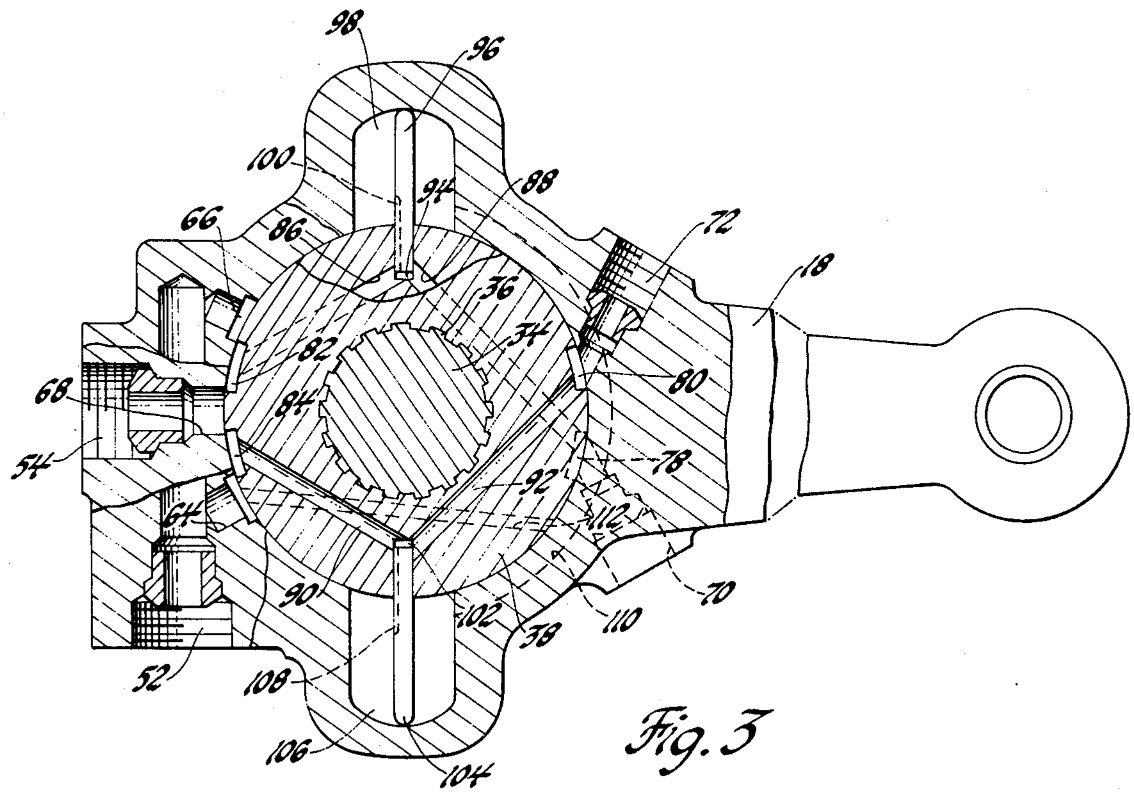
FIG. 3 is a sectional view taken along line 3—3 of FIG. 2.
Figure 4:
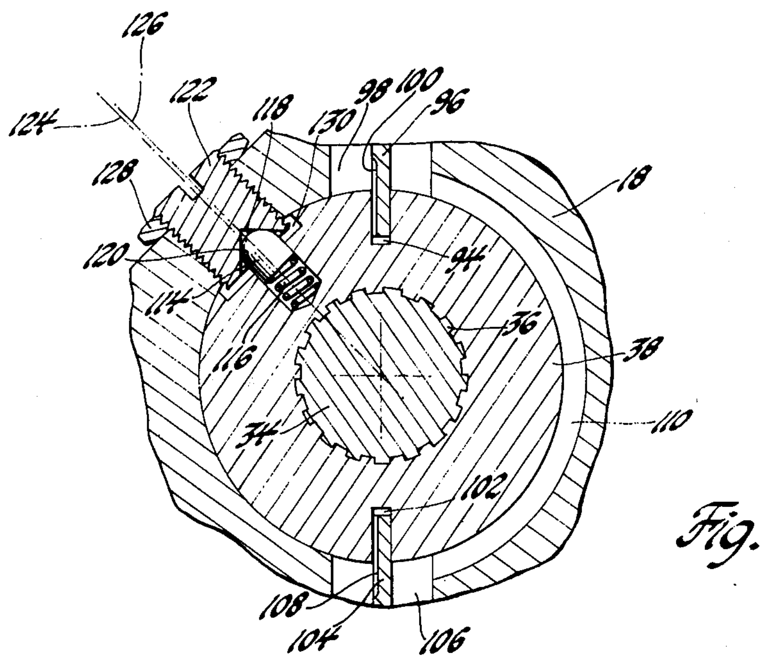
FIG. 4 is a sectional view taken along line 4—4 of FIG. 2.

The steering gear 16 is of a conventional type as far as the internal parts are concerned. Conventional steering gears have a pitman shaft which produces limited rotary output dependent on the rotary input of the steer shaft. Shown in FIG. 2 is a pitman shaft 34 which has a splined end 36. The splined end 36 is engaged with splines formed in a valve element 38. This spline connection is also seen in FIGS. 3 and 4. The valve element 38 is rotatably disposed in the pitman arm 18. The valve 38 is axially located in the pitman arm 18 by a pair of cover plates 40 and 42 which are secured to the pitman arm by fasteners 44 and 46, respectively. A pair of O-ring type seals 48 and 50 are disposed between the end caps 40 and 42, respectively, which end caps prevent leakage from between the valve 38 and pitman arm 18 toward the splined portion 36 of pitman shaft 34.

As best seen in FIG. 3, there is formed in the pitman arm 18 a pair of ports 52 and 54 which are connected by hoses 56 and 58 respectively to a conventional power steering pump 60 as seen in FIG. 1. The power steering pump 60 is driven by a belt 62 in a conventional manner from an internal combustion engine, not shown. The port 52 is connected to a pair of exhaust ports 64 and 66 formed in the pitman arm 18. The port 54 is in fluid communication with a port 68 also formed in the pitman arm 18. The pitman arm 18 has two other ports 70 and 72 formed therein, which ports are connected by hoses 74 and 76 respectively, to the hydraulic motor 24. The valve 38 has recesses 78 and 80 formed thereon, which recesses 78 and 80 are in fluid communication with ports 70 and 72, respectively. Also formed on the valve 38 are recesses 82 and 84. The recess 82 may be selectively placed in fluid communication with ports 66 and 68 or with both ports simultaneously, as shown. Recess 84 may be selectively placed in fluid communication with ports 64 or 68 with both ports, as shown. The recess 82 is in fluid communication through drilled passages 86 and 88 with the recess 78 while the recess 84 is in fluid communication through drilled passages 90 and 92 with the recess 80. The passages 86 and 88 are also in fluid communication with a vane pocket 94 in which is slidably disposed a vane 96. The outer end of the vane 96 is disposed in a chamber 98 formed in the pitman arm 18. Fluid communication with the chamber 98 on one side of vane 96 is provided through an undercut area 100 formed in the vane 96. Thus, the pressure in passage 86 will be fed to the left side, as seen in FIG. 3, of vane 96 into chamber 98. The passages 90 and 92 are in fluid communication with a vane pocket 102 formed in the valve 38, in which is slidably disposed a vane 104 the outer end of which is disposed in a chamber 106. Fluid communication between passage 90 and the space between the left side of vane 104 and chamber 106 is provided through an undercut passage 108 formed in vane 104. Thus, the fluid pressure in passage 90 is introduced to the chamber 106. A groove 110 is formed in the pitman arm 18 between a right side of vane 96 in chamber 98 and the right side of vane 104 in chamber 106, as seen in FIGS. 3 and 4. This groove 110 is also connected to a passage 112 to the port 64 which is in fluid communication with port 52.

As seen in FIG. 4, the valve member 38 has slidably disposed therein a plug member 114 which is spring-loaded radially outwardly by a compression spring 116. The plug 114 has a rounded head 118 which abuts a conical shaped pocket 120 formed in a threaded member 122. The threaded member 122 is threadably secured in the pitman arm 18. The central axis 124 of the threaded member 122 is offset from the central axis 126 of the conical recess 120. Thus, as the threaded member 122 is rotated, the centerline 126 of the conical recess 122 will rotate about axis 124 and since the plug 114 bears against that conical surface, the plug member and therefore the valve member 38 will be moved relative to the pitman arm 18. This permits centering of the valve member 38 within the pitman arm 18 such that the recesses 82 and 84 can be properly aligned with ports 64, 68 and 66 as shown in FIG. 3.

The valve member 38 must be centered as shown in FIG. 3, such that the hydraulic motor 24 is evenly pressurized so that there is no output force from the hydraulic motor when the valve 38 is in the neutral or center position. The threaded member 122 is secured in position in the pitman arm 18 by a lock nut 128. It will be noted that the threaded member 122 extends past the inner surface of pitman arm 18 a slight distance. This protrusion is into a pocket 130 formed in the valve 38. This permits a mechanical override to occur should the hydraulic pressure system not have sufficient pressure available to drive the linear motor in response to steer command. The threaded member 122 will be abutted by the valve 38 after a predetermined amount of rotation to provide a mechanical drive between the pitman shaft 34 and the pitman arm 18. This predetermined movement of the valve 38 is greater than the movement necessary to control fluid flow through the system to generate the required pressure forces necessary to operate the linear motor.

The following is a description of operation of the above-described system.

The port 54 is connected to the high pressure side of pump 60 and the port 52 is connected to the low pressure or return side of pump 60. In the neutral position shown, the pressure distribution throughout the system is balanced by the position of the recesses 82 and 84 as determined by the centering mechanism comprised of plug 114 and threaded member 122, as described above. Should the operator desire a steering maneuver, he will rotate the steering wheel assembly and therefore steer input shaft 12 in either a clockwise or counterclockwise position. Assuming, as viewed in FIG. 3, a counterclockwise rotation is encountered by shaft 34, the recess 82 will become fully opened to port 68 and therefore high pressure from the pump 60, while the recess 84 will be opened to port 64 and therefore the low pressure side of pump 60. The high pressure oil is distributed through passages 86 and 88 to port 70 from which, it is distributed through hose 74 to the rod end of cylinder 26. Thus, the cylinder 26 and linkage 22 is urged to the right as viewed in FIG. 1. The hose 76 and therefore the piston end of the cylinder 26 is connected to exhaust to port 72. The chamber 98 to the left of vane 96 is also subjected to high pressure oil and therefore produces a force in the clockwise direction on valve 38 in opposition to the input force supplied by the operator. The area of vane 96 exposed to fluid pressure is considerably less than the area of the hydraulic motor exposed to pressure so that the entire steering effort is not felt by the operator, however, the steer effort will increase as pressure increases so that the operator will be aware of heavier steering efforts as they occur. As the motor 24 is pressurized, the linkage 22 will be driven by the motor such that the pitman arm will be rotated relative to the valve 38 such that if the steering input rotation is ceased, the valve will be centered by movement of the pitman arm 18.

If the valve 38 is rotated in the clockwise direction, as viewed in FIG. 3, the recess 84 is subjected to high pressure from pump 60, while the recess 82 is subjected to low pressure. When the recess 84 is subjected to high pressure, the passages 90 and 92 therefore port 72 are open to high pressure as is hose 76. Thus the piston end of cylinder 26 is subjected to high pressure while the rod end is subjected to low pressure. Thus, the cylinder 26 and linkage 22 are urged to the left as viewed in FIG. 1. Also subjected to the pressure from pump 60 is the chamber 106 to the left of vane 104 to provide a counterclockwise force on the valve 38 to permit operator feel as explained above. It should be noted that the chamber 106 and vane 104 form a larger reaction area than the chamber 98 and vane 96. This is to provide steer efforts which are different between clockwise and counterclockwise rotation. Since the one end of motor 24 is a larger area of operation, the reaction chamber must also have a larger area of operation so that the steer efforts will be consistent in both directions of operation. As explained above, the hydraulic motor when pressurized will produce a force on the steer linkage 22 which moves the pitman arm 18 so as to provide a closing motion for the valve 38 should the operator cease his turning maneuver.

What is claimed is:

1. In a vehicle steering system including a manual steering gear having an output pitman shaft, a steering linkage including a pitman arm and a linear hydraulic motor, and hydraulic pump means for supplying pressurized fluid, the improvement comprising; a valve member disposed in said pitman arm and being connected for rotation in unison with said pitman shaft; passage means formed in said valve member and said pitman arm for directing fluid between said pump and said hydraulic motor to provide hydraulic power for steering in response to rotation of said pitman shaft; hydraulic reaction means disposed on said valve member and said pitman arm in fluid communication with said passage means for establishing steer effort feel on said pitman shaft in proportion to the pressure in the hydraulic motor, said hydraulic reaction means being comprised of a pair of chambers formed in said pitman arm and a vane disposed in each of said chamber and said valve member, the space between one side of said vanes and said chambers being in fluid communication with said passage means; and mechanical centering and override means disposed between said valve member and said pitman arm for limiting relative movement therebetween and for centering said valve member in said pitman arm.

2. In a vehicle steering system including a manual steering gear having an output pitman shaft, a steering linkage including a pitman arm and a linear hydraulic motor, and hydraulic pump means for supplying pressurized fluid, the improvement comprising; a valve member disposed in said pitman arm and being connected for rotation in unison with said pitman shaft; passage means formed in said valve member and said pitman arm for directing fluid between said pump and said hydraulic motor to provide hydraulic power for steering in response to rotation of said pitman shaft; and hydraulic reaction means disposed on said valve member and said pitman arm in fluid communication with said passage means for establishing steer effort feel on said pitman shaft in proportion to the pressure in the hydraulic motor, said hydraulic reaction means being comprised of a pair of chambers formed in said pitman arm and a vane disposed in each of said chamber and said valve member, the space between one side of said vanes and said chambers being in fluid communication with said passage means.

* * * * *